Dec. 26, 1961   J. W. MEACHAM   3,015,082
PLUG-IN BUSWAY
Filed Oct. 23, 1958   3 Sheets-Sheet 1
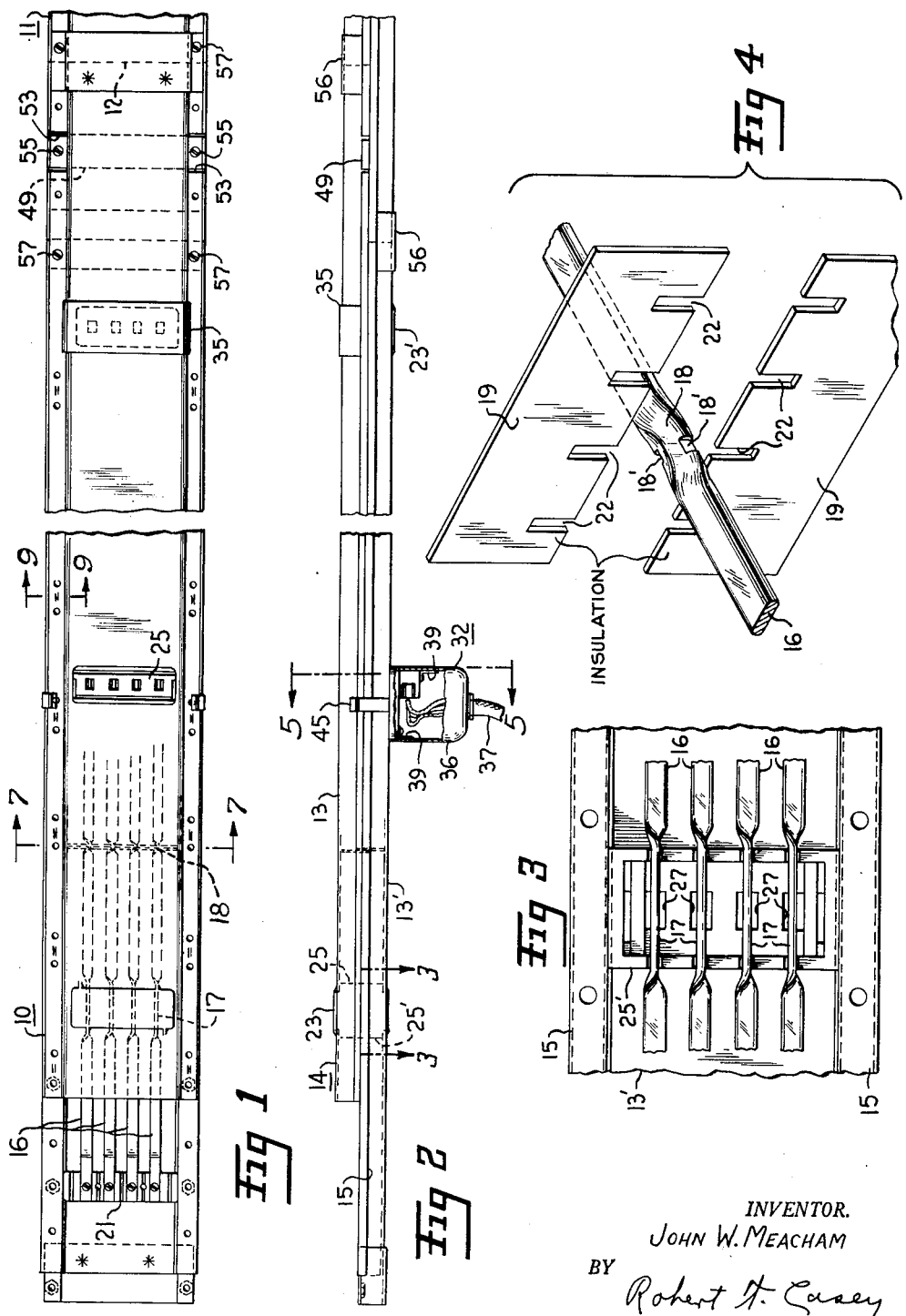
INVENTOR.
JOHN W. MEACHAM
BY Robert H. Casey
ATTORNEY Dec. 26, 1961   J. W. MEACHAM   3,015,082
PLUG-IN BUSWAY
Filed Oct. 23, 1958   3 Sheets-Sheet 2

INVENTOR.
JOHN W. MEACHAM,
BY J. Welly Hawbrer
ATTORNEY.

INVENTOR.
JOHN W. MEACHAM
BY Robert F. Casey
ATTORNEY

United States Patent Office 3,015,082
Patented Dec. 26, 1961

3,015,082
PLUG-IN BUSWAY
John W. Meacham, Windsor, Conn., assignor to General Electric Company, a corporation of New York
Filed Oct. 23, 1958, Ser. No. 769,213
7 Claims. (Cl. 339—22)

My invention relates to electric power busway systems of the type comprising an elongated housing or duct containing a plurality of bus bars adapted to receive plug-in type power take-off devices at longitudinally spaced points, and especially to such busway systems of low-ampere-rated capacity.

Prior art electric power busway systems of the low-ampere-rated type, that is, in the neighborhood of 100-ampere capacity, have not been competitive with the primary alternate type of power distribution, that is, wire contained in metallic conduit. This is largely because the construction of such prior low-ampere-rated busways has been relatively expensive and complicated. In addition, the preference for the conduit-and-wire type of distribution system was due to the fact that no great advantages in the way of ease and low cost of installation were provided by such prior art busway.

It is a general object of my invention to provide an electric power busway of the low-ampere-rated type which is of low cost to manufacture and extremely easy to install, light in weight, and possesses high mechanical resistance to short circuit stresses.

It is a particular object of the invention to provide an electric power busway which is adapted to receive plug-in type power take-off devices at longitudinally spaced points on either of two opposite sides thereof and which provides a "dead front" construction.

It is a particular object of my invention to provide a busway system including an elongated busway housing having plug-in apertures in the opposite walls thereof, each of said apertures being covered by a readily removable integral section of the housing, the construction being such that when such cover sections are removed, the apertures in the housing are filled by an insulator member which is flush with the outer surface of the housing to provide a "dead-front" construction.

In accordance with the invention, a busway system is provided including an elongated housing of generally rectangular cross-section containing a plurality of elongated parallel bus bars of generally strap-like cross-section. The bus bars are arranged in edge-to-edge generally coplanar relation throughout their major intermediate portions to provide high mechanical resistance to short-circuit stresses, and have longitudinally spaced localized intermediate portions twisted at 90-degrees to the general plane of the intermediate portions, to provide readily usable plug-in contact portions.

In accordance with another aspect of the invention, the bus bars are further supported at their intermediate plug-in contact portions by an insulator assembly which supports the bars with respect to movement in all directions including longitudinally and which includes a raised or embossed area fitting into a corresponding opening in the enclosure wall with its outer surface flush with the outer surface of the wall. The outer surface of the embossed portion is nevertheless covered by an offset portion of the enclosure wall which is made readily separable therefrom in the manner of a "knockout" to provide access to the plug-in openings of the insulator.

Other advantages of the invention will become apparent from the following detailed description and the particular extent of the invention will be pointed out in the appended claims.

In the drawings:

FIGURE 1 is a top plan view of a portion of a busway system including two interconnected busway sections, portions thereof being broken away;

FIGURE 2 is a side elevational view of the distribution apparatus of FIGURE 1;

FIGURE 3 is a sectional view taken on the lines 3—3 of FIGURE 2;

FIGURE 4 is a fragmentary perspective view of a portion of a bus bar and its insulating supports as used at an intermediate part of the busway;

Figure 5:
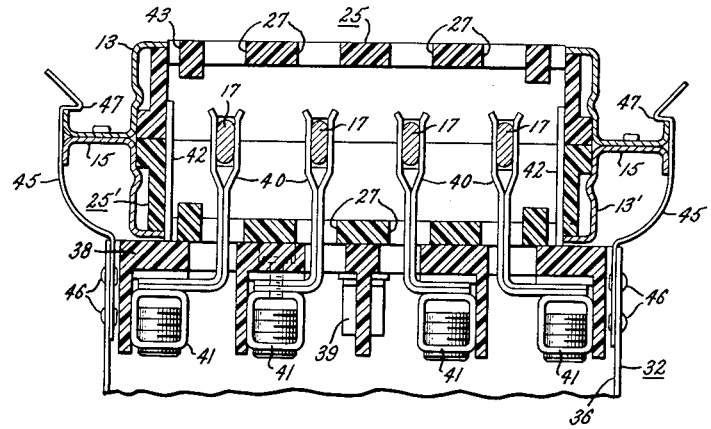
FIGURE 5 is a sectional view taken on the line 5—5 of FIGURE 2.
Figure 7:
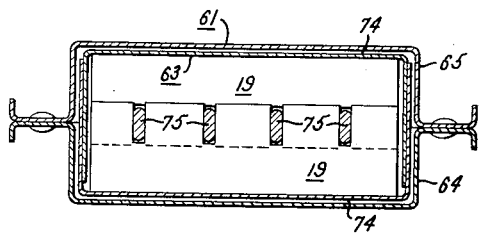
FIGURE 7 is a sectional elevation view taken generally on the line 7—7 of FIGURE 1.

In the drawings, the invention is shown as incorporated in a busway system which comprises basic sections of predetermined or fixed length, having longitudinally spaced sockets or power take-off points and power take-off plugs for use with such take-off points.

Figure 9:
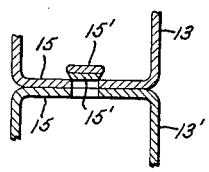
FIGURE 9 is a fragmentary sectional view taken on the line 9—9 of FIGURE 1.
Figure 6:
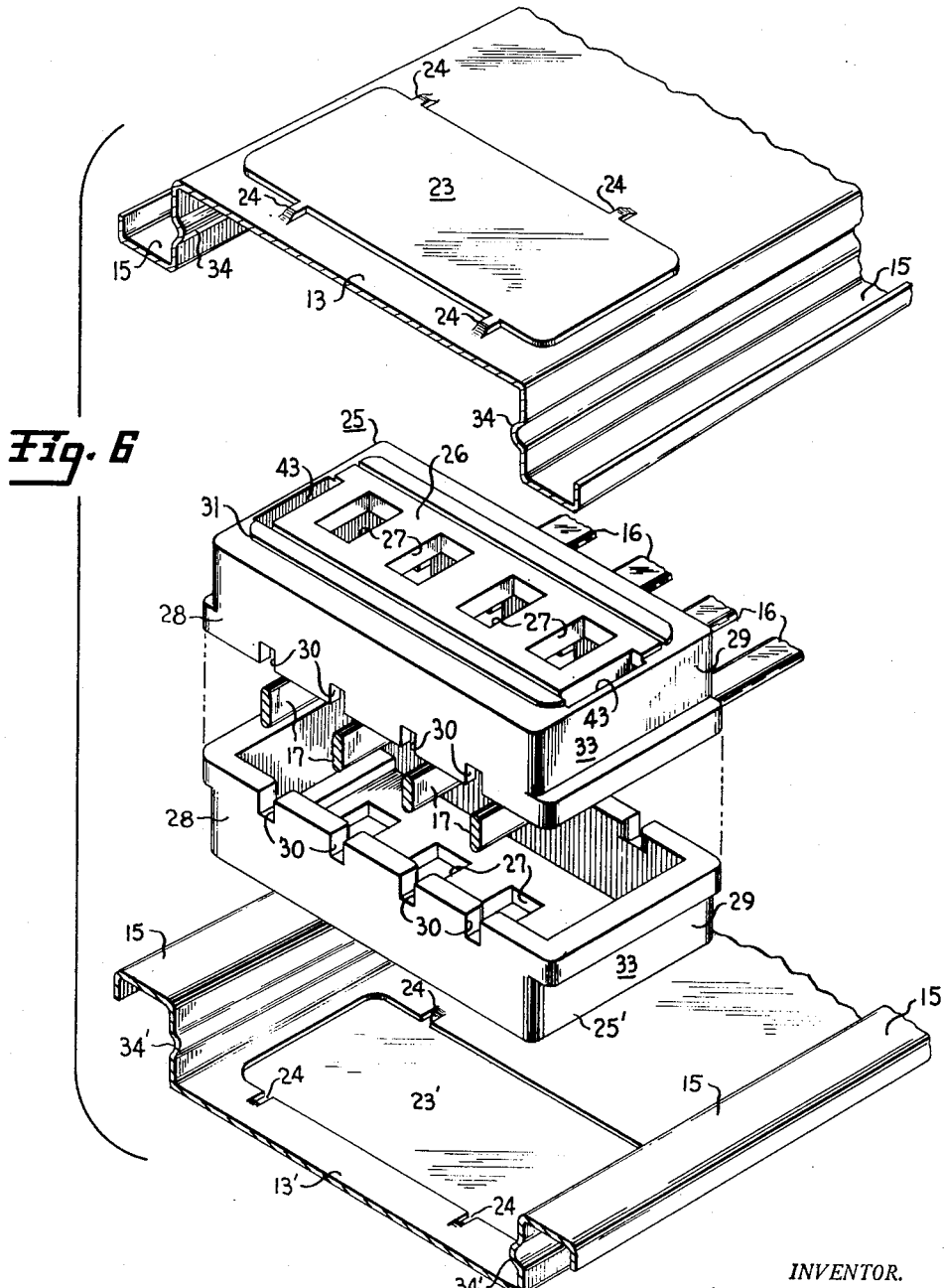
FIGURE 6 is an exploded perspective view of a portion of the busway showing in particular the construction of the bus bar insulating and supporting means and the plug-in openings and covering means therefor.

In FIGURE 1 is shown a portion of a busway system incorporating the invention and comprising two fixed-length sections 10 and 11, said sections meeting at the line 12. Each busway section 10 and 11 comprises an elongated generally rectangular metallic housing or enclosure 14 comprising generally channel-shaped top and bottom members 13, 13'. Each of the members 13, 13' has outwardly directed flanges 15, by which they are interconnected by cutting and deforming integral portions 15' (see FIG. 9) of the flanges 15 out of the general planes of the flanges. Suitable alternate fastening means, such as bolting, riveting or welding, may also be used.

A plurality of generally parallel bus bars 16 are supported within the housing in insulated relation thereto. The bus bars 16 comprise relatively wide, thin, flat strip conductive material, and for the purposes of providing maximum resistance to deflection by short circuit forces, the bars are mounted with their major intermediate portions in edge-to-edge relation in a common plane. For the purpose of facilitating the making of plug-in contact, however, the bus bars have longitudinally spaced portions 17 twisted at 90-degrees to the general plane of the intermediate portions. They also are provided with portions 18 twisted at 90° to the general plane of the intermediate portions and at these twisted portions they are supported by means of a pair of insulating members 19 of sheet insulating material such, for instance, as vulcanized fiber, see FIGURE 4. The insulating members 19 have the edges thereof notched at 22 to fit around the bus bars at the twisted portion 18 which are provided with notches 18' to receive the members 19 which serves to hold the members 19 in place. It will be observed that since the insulating members 19 extend in opposite directions and overlap at the point where they fit over the bus bars, the bus bars at this point are substantially completely encircled by insulating material and are supported from substantially all movement with respect to the sidewalls of the enclosure 14.

For the purpose of insulating and supporting the portions 17 of the bus bars 16 which are adapted to receive the plug-in contacts of a power take-off device, insulating means is provided including a pair of insulating members 25 and 25'. Each of the insulators 25, 25' has a generally planar outer surface or top wall 26 provided with spaced openings 27 and with depending peripheral side and end walls 28 and 29, respectively, which register in mating relation so that when the two insulator members 25, 25' are brought into assembly they form a generally box-like construction.

For the purpose of accommodating the portions 17 of the bus bars 16, each of the insulators has its sidewalls 28 provided with generally rectangular notches 30 cut therein and arranged to register with each other to provide openings through which the bus bar portions 17 pass. Each of the insulator portions 25, 25' also includes a generally rectangular raised or embossed area on the top wall thereof providing a shoulder 31.

The top and bottom walls 13, 13' of the enclosure 14 are provided with integral portions 23, 23', which are generally rectangular in shape and severed from the corresponding wall at all points on its periphery except at a plurality of isolated connecting portions 24. The portions 23, 23' are also offset from the general plane of the wall portions a distance equal approximately to the thickness of stock of the cover. The raised portions of the insulators 25, 25' are received within the opening left when the cover portion 23, 23' is offset. Thus, although the embossed areas of the insulators come substantially flush with the surfaces of the walls 13, 13' thereof, they are, at al times prior to use, covered by the removable sections 23, 23'. The cover sections 23, 23' may be easily removed by breaking the connecting portions 24, such as by cutting them with suitable tools such as a pair of cutting pliers, or breaking them by a prying action such as with a screwdriver. The insulator members 25, 25' are also provided with recessed portions 33 at each end thereof to provide clearance for the inwardly deformed strengthening rib portions 34, 34' of the cover members 13, 13'.

It will be observed that the described insulator construction provides a substantially "dead front" assembly, so that even if the outlet covers or knockout portions 23, 23' are removed, no bus bar parts are exposed for easy contact. If desired, however, such an outlet opening, if not used after removal of the cover member 23', may be covered by a removable generally U-shaped cover member 35 which may be snapped into place, being retained by engagement of projections on the sidewall portions thereof which enter the channels formed by the rib members 34, 34' in the cover portions 13, 13'.

For the purpose of taking power from the bus bars 16, there is provided a power take-off plug-in device such, for example, as shown at 32 of FIGURE 2 and FIGURE 5. The power take-off plug 32 includes a generally rectangular box-like metallic enclosure 36 having a closed bottom wall through which the power take-off cable 37 extends, and an open top wall. The open top wall is substantially closed by a generally rectangular insulating plate 38 which is supported within the enclosure 36 by suitable means such as by being attached by screws to generally L-shaped supporting brackets 39 on the sidewalls of the enclosure. The insulating plate 38 serves to support a plurality of aligned pairs of contact jaws or plug-in connectors 40 each being rigidly mounted, together with a corresponding pressure-type connector 41, to the insulating plate 38 by suitable means such as by screws, not shown.

Also mounted on the insulating plate 38 is a pair of polarizing barriers 42 preferably of insulating material such as nylon, which extend slightly beyond the contact jaws 40. The contact jaws 40 extend into the openings 27 of the insulator 25 and the polarizing barriers 42 enter the openings 43 of the insulators 25. The polarizing barriers 42 are longitudinally displaced with respect to the contact jaws 40 on the plug 32. This requires that the plug be inserted in one particular position on the duct and cannot be inserted in a position 180 degrees reversed. The polarizing barriers 42 extend beyond the contact jaws 40 for the purpose of preventing even a partial insertion of such contact jaws into the openings 27 when the plug is in the incorrect position.

For the purpose of retaining the plug on the busway and of making a ground connection between the housing thereof and the busway, there is provided a pair of resilient latch members 45 which are attached to the opposite sides of the plug body 36 by suitable means such as by rivets 46. The latch members 45 have the end portions thereof formed at 47 to provide hook portions which can slide easily over the flange portions 15 of the enclosure covers 13, 13'. The plug may, therefore, be easily inserted on the busway housing by simple plug-in motion and retained thereon in physical and electrical engagement.

Figure 8:
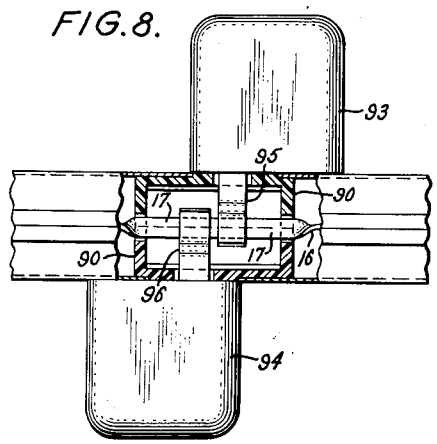
FIGURE 8 is a fragmentary elevation view of a busway incorporating a modified plug-in insulator.

In FIGURE 8 there is shown a modified form of plug-in insulator. In this form, the insulator 90 has its plug-in openings on one side of the busway offset longitudinally from the plug-in openings on the other side of the busway, so that two power take-off plugs 93, 94 may be inserted simultaneously from opposite sides of the busway at the same insulator location. The contact jaws 95, 96 of the plugs, in this form, contact side-by-side areas of the bus bars 17.

While I have described only one embodiment of the invention, it will be apparent that many modifications thereof may be made, and I therefore intend, by the appended claims, to cover all such modifications as fall within the true spirit and scope of the invention.

What I claim as new and desire to secure by Letters Patent of the United States is:

1. An electric power busway system comprising an elongated enclosure of generally rectangular cross-section, a plurality of elongated generally parallel strap-like bus bars supported in edge-to-edge relation with their relatively wide surfaces in a substantially common plane, each of said bus bars having transversely aligned portions thereof twisted at 90 degrees to said common plane and insulating and supporting means comprising a pair of insulating supports each having a plurality of notches cut in one edge thereof and fitting over said bus bars at said transversely aligned twisted portions, said insulating supports extending in overlapped relation in engagement with said bus bars.

2. An electric power busway comprising an elongated enclosure of generally rectangular cross-section, a plurality of bus bars supported in side-side-side insulated relation in said housing, and having transversely aligned portions exposed for contact within said housing, a molded insulator for supporting said bus bars in spaced relation at said plug-in portions, said enclosure having a portion thereof adjacent said plug-in portions of said bus bars cut away from the general plane of said enclosure wall and displaced out of the plane of said wall, said insulator having an embossed portion fitting in and substantially filling in the opening left by said displaced section and presenting a surface substantially flush with the exterior surface of said enclosure wall, said displaced section having integral connecting portions connecting it to said cover portion of said enclosure and readily severable to permit the removal of said section to provide access to said plug-in portions.

3. An electric power busway system comprising an elongated enclosure of generally rectangular cross-section, a plurality of bus bars supported in insulated side-by-side relation in said enclosure, said bus bars having transversely aligned intermediate portions exposed for contact by contacts of a plug-in type power take-off device within said enclosure, a molded insulator supported within said enclosure adjacent said exposed portions and extending from side to side of said enclosure over said exposed portions and having a plurality of openings therein registering with said exposed portions, said enclosure having a generally planar metallic wall portion extending over said exposed bus bar portions, said wall portion having a generally rectangular section thereof severed from the adjacent wall portions at all portions of the periphery of said rectangular section except a plurality of relatively small connecting portions, said rectangular section being displaced relative to the general plane of said wall portion so as to create a generally rectangular recess in the inner surface of said wall portion, said molded insulator having a generally rectangular raised boss area closely fitting in and substantially filling said recess portion to maintain said insulator in a fixed position longitudinally of said enclosure and presenting a surface substantially flush with the exterior surface of said enclosure wall, whereby said rectangular wall section normally covers said openings in said insulator and prevents access to said exposed portions of said bus bars but is easily removable by severance of said relatively small connecting portions to provide access to said bus bar connecting portions.

4. An electric power busway comprising an elongated enclosure of generally rectangular cross-section, a plurality of electric power bus bars supported in side-by-side insulated relation within said enclosure, said bus bars having a plurality of transversely aligned exposed plug-in contact portions, said enclosure having a pair of opposed generally planar wall portions of metallic material adjacent said exposed contact portions of said bus bars, said wall portions each being provided with a pair of opposed access openings adjacent said exposed bus bar portions, electrical insulating and supporting means for said exposed contact portions comprising a pair of molded insulator members each having an outer wall portion extending parallel to said enclosure wall portions and disposed to close said access opening, said outer wall portions each being provided with a plurality of openings registering with said exposed portions of said bus bars, said insulator members also including side wall portions depending from said outer wall portion, said side wall portions of said insulators abutting each other to form a box-like insulating enclosure for said exposed contact portions, an opposed pair of said side wall portions of said insulator members being provided with matching notch portions to allow passage of said bus bars therethrough.

5. An electric power busway as set forth in claim 4 wherein each of said insulator members also includes a raised boss portion fitting into and substantially filling said rectangular opening in said enclosure wall portion and presenting a surface substantially flush with the exterior surface of said enclosure wall.

6. An electric power busway comprising an elongated enclosure of generally rectangular cross-section, a plurality of electric power bus bars supported in side-by-side insulated relation in said housing and having transversely aligned portions exposed for contact with said housing, insulating means for supporting said bus bars against deflection by short-circuit current forces comprising a pair of molded insulator members supported within said housing on opposite sides of said bus bars and having mutually abutting surfaces including portions adapted to surround said bus bars, each of said insulator members having an outer wall portion extending parallel to said enclosure wall portions and disposed to close said access openings, said access openings being longitudinally offset whereby contact members of power take-off plug-in devices engage said bus bars wherein contacts of plug-in type power take-off devices may be inserted simultaneously from opposite sides of said busway and engage side-by-side portions of said bus bars within the area enclosed by said insulator members.

7. An electric power busway comprising an elongated enclosure of generally rectangular cross-section, a plurality of generally parallel bus bar conductors of relatively wide, thin, flat construction having their major portions positioned in spaced-apart edge-to-edge relation in a common plane within said housing, and having a plurality of intermediate portions thereof twisted at 90 degrees to said common plane, insulating and supporting means engaging and supporting said bus bars at said twisted intermediate portions for supporting said bus bar conductors away from the sides of said housing, and means providing access through said enclosure to certain of said intermediate portions to permit plug-in contact therewith of power take-off devices by movement normal to said plane.

References Cited in the file of this patent

UNITED STATES PATENTS

| | | |
|---|---|---|
| 1,132,673 | Murray | Mar. 23, 1915 |
| 1,239,223 | Ross | Sept. 4, 1917 |
| 2,028,509 | Knell | Jan. 21, 1936 |
| 2,088,375 | Janisch | July 27, 1937 |
| 2,115,143 | Harrison | Apr. 26, 1938 |
| 2,247,088 | Hill | June 24, 1941 |
| 2,264,075 | Frank | Nov. 25, 1941 |
| 2,269,177 | Borchert et al. | Jan. 6, 1942 |
| 2,306,353 | Cole et al. | Dec. 22, 1942 |
| 2,318,860 | Huguelet | May 11, 1943 |
| 2,359,247 | Rowe | Sept. 26, 1944 |
| 2,495,526 | King | Jan. 24, 1950 |
| 2,720,632 | Stieglitz | Oct. 11, 1955 |
| 2,725,541 | Born et al. | Nov. 29, 1955 |
| 2,725,542 | Born et al. | Nov. 29, 1955 |
| 2,732,420 | Sillman | Jan. 24, 1956 |

FOREIGN PATENTS

| | | |
|---|---|---|
| 685,845 | Germany | Dec. 27, 1939 |